United States Patent [19]

Dotti et al.

[11] Patent Number: 4,867,527

[45] Date of Patent: Sep. 19, 1989

[54] COMBINED ELECTRICAL POWER AND OPTICAL FIBER CABLE

[75] Inventors: Enrico Dotti, Milan; Giorgio Grasso, Momza; Gianmario Lanfranconi, Trezzo Sull'Adda, all of Italy

[73] Assignee: Societa' Cavi Pirelli S.p.A., Milan, Italy

[21] Appl. No.: 172,656

[22] Filed: Mar. 24, 1988

[30] Foreign Application Priority Data

Mar. 31, 1987 [IT] Italy ............................. 19905 A/87

[51] Int. Cl.⁴ .............................................. G02B 6/44
[52] U.S. Cl. .................................................. 350/96.23
[58] Field of Search ..................................... 350/96.23

[56] References Cited

U.S. PATENT DOCUMENTS

| 4,550,976 | 11/1985 | Cooper et al. | 350/96.23 |
| 4,676,590 | 6/1987 | Priaroggia | 350/96.23 |
| 4,679,898 | 7/1987 | Grooten | 350/96.23 |
| 4,699,459 | 10/1987 | Priaroggia | 350/96.23 X |

FOREIGN PATENT DOCUMENTS

| 2825845 | 1/1980 | Fed. Rep. of Germany | 350/96.23 |
| 2239742 | 2/1975 | France | 350/96.23 |
| 2152235 | 7/1985 | United Kingdom | 350/96.23 |
| 2157847 | 10/1985 | United Kingdom | 350/96.23 |

Primary Examiner—John D. Lee
Assistant Examiner—John Ngo
Attorney, Agent, or Firm—Brooks Haidt Haffner & Delahunty

[57] ABSTRACT

A cable for conveying both electrical power and optical signals, the cable having an electric conductor with insulation therearound, a sheath around the insulation, a one or two part protective layer around the insulation, a tube within the protective layer and at least one optical fiber loosely received in the tube. The protective layer can have armoring therearound and in this case, the radial thickness of the protective layer is from two to four times the diameter of the tube.

20 Claims, 1 Drawing Sheet

10 OPTICAL FIBERS
9 METAL TUBE
2 CONDUCTOR
3 SEMI CONDUCTIVE LAYER
4 INSULATION
5 SEMI CONDUCTIVE LAYER
6 METAL SHEATH
7 REINFORCING LAYER
8 PROTECTIVE LAYER

- 10 OPTICAL FIBERS
- 9 METAL TUBE
- 2 CONDUCTOR
- 3 SEMI CONDUCTIVE LAYER
- 4 INSULATION
- 5 SEMI CONDUCTIVE LAYER
- 6 METAL SHEATH
- 7 REINFORCING LAYER
- 8 PROTECTIVE LAYER

COMBINED ELECTRICAL POWER AND OPTICAL FIBER CABLE

The present invention relates to a cable for conveying electric power which comprises optical fibers intended for the transmission of optical signals.

Owing to the ever increasing development of the telecommunication systems using optical fibers, the possibility of introducing the latter in electric cables becomes more and more useful in order to achieve, with a single cable and only one laying operation, the twofold result of conveying electric power and of transmitting optical signals.

Suspended electric cables incorporating optical fibers, such as, for example, the cable described in the French Patent No. 2,239,742, are already known. In said cables, the optical fibers are encased in the central portion of the cable.

Obviously, it also would be very convenient to carry out the transmission of optical signals by means of other types of cables for conveying electric power, such as, for example, underwater or underground cables, but in such cases, the conventional solution has some disadvantages.

In fact, the prior art cable mentioned hereinbefore involves the use of a duct in the central portion of the cable, with a consequent increase in the cable diameter. This makes the cable more difficult to handle and increases its production cost since if the insulations and protecting layers are unchanged, a greater amount of material is required.

Therefore, one object of the present invention is to eliminate such drawbacks and to provide a cable, able to convey electric power and to transmit optical signals, which has good handling characteristics and has a production cost substantially equal to that of the cables used only to convey electric power.

Accordingly, the cable of the present invention is a cable for conveying electric power and for transmitting optical signals which comprises at least an electric conductor, an insulation surrounding the conductor, a covering sheath and at least an outer protective layer, said cable being characterized in that said outer protective layer has at least one longitudinal duct or channel containing at least one optical fiber.

In a preferred embodiment of the invention, said longitudinal ducts are provided by tubes.

In another embodiment, the outer protective covering is formed by two layers, one of extruded material and the other of wound tapes.

When the cable is provided with an external armor, the thickness of the protective layer formed by the wound tapes ranges between two and four times the diameter of the tube providing the longitudinal duct.

Other objects and advantages of the present invention will be apparent from the following detailed description of the presently preferred embodiments thereof, which description should be considered in conjunction with the accompanying drawings in which.

Figure 1:
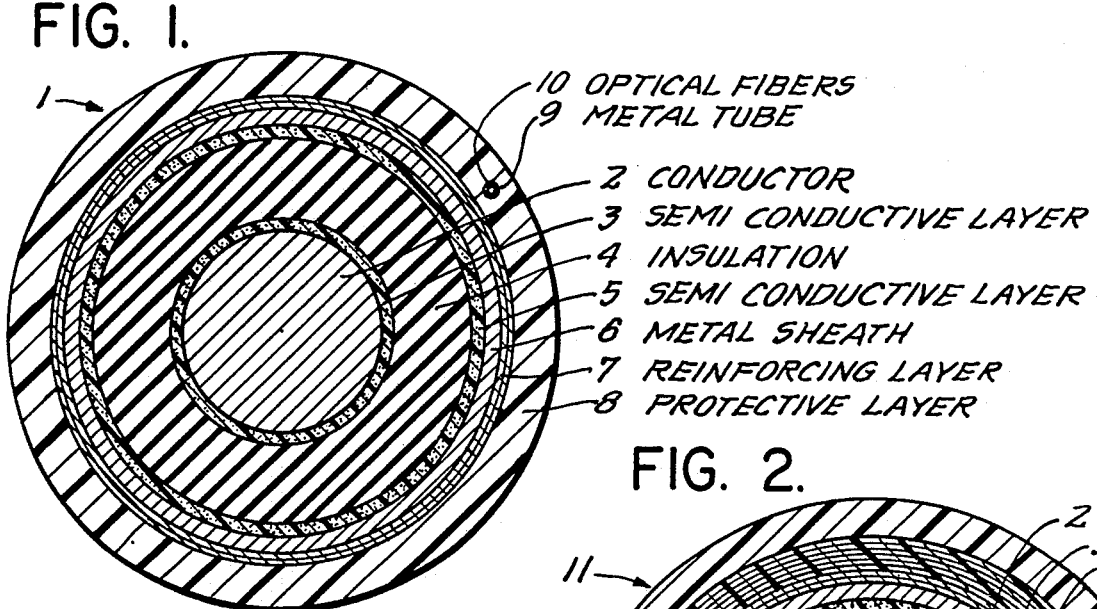
FIG. 1 is a transverse cross-section of a cable according to a preferred embodiment of the present invention.

With reference to FIG. 1, a cable 1 comprises a central conductor 2, a first semi-conductive layer 3, an insulating layer 4, a second semi-conductive layer 5, a metal sheath 6, optionally, a reinforcing layer 7 and a protective layer 8 of polyethylene.

According to the invention, a longitudinal duct or channel 9 is formed in the polyethylene protective layer 8 and loosely receives one or more optical fibers 10. Said longitudinal duct 9 can be a tube of stainless steel which is embedded in the cable during the extrusion of the protective layer 8 made of polyethylene. A plurality of longitudinal ducts 9 can be arranged along the same circumference of the cable section.

Figure 2:
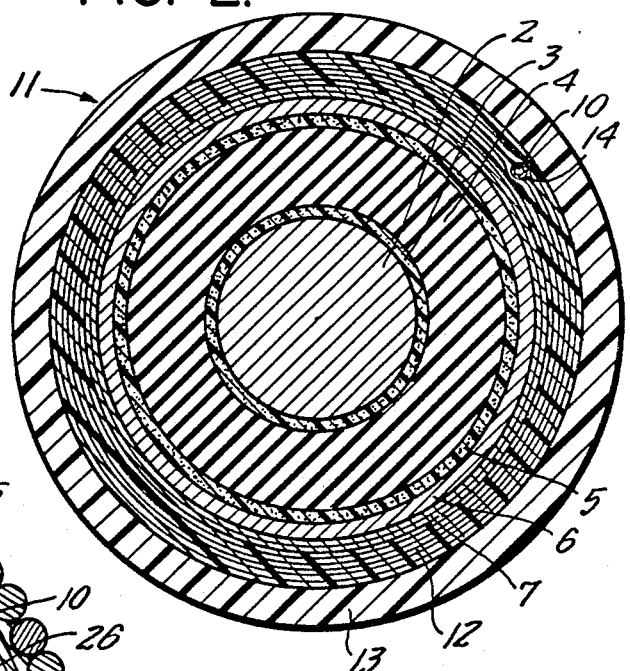
FIG. 2 is a transverse cross-section of a second embodiment of a cable of the present invention.

The cable 11 shown in FIG. 2, the components of which are also shown in FIG. 1 being identified with the same reference numerals, differs from cable 1 in that it has two protective layers, i.e. a first layer 12 formed by a winding of tapes of plastic material and a second layer 13 formed by extruded polyethylene, on the sheath 6 and the optional reinforcing layer 7.

In this case, the longitudinal duct is a tube of stainless steel 14, which is embedded in the cable during the winding of the tapes 12 of plastic material on the reinforcing layer 7. After the tapes are wound, the second protective layer 13 is extruded thereover.

Figure 3:
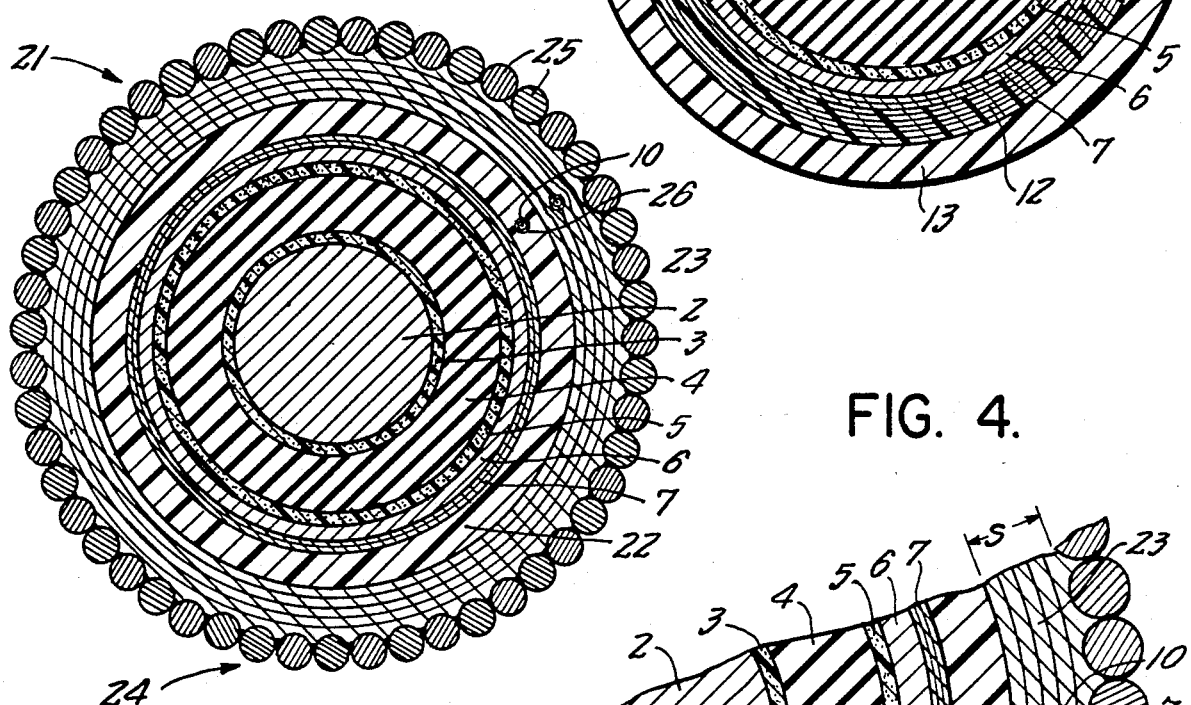
FIG. 3 is a transverse cross-section of a third embodiment of a cable of the invention.
Figure 4:
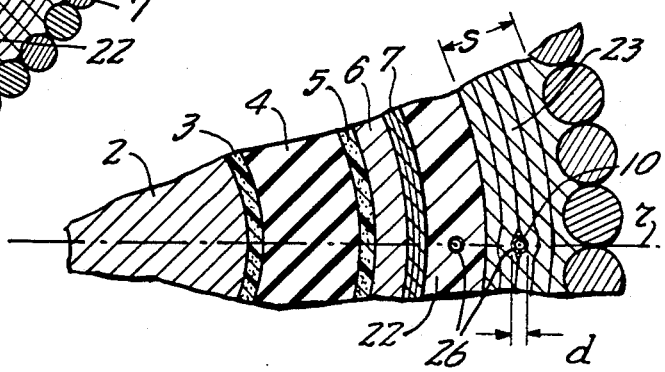
FIG. 4 is a transverse, fragmentary, enlarged cross-section of a portion of the cable shown in FIG. 3.

The cable 21 shown in FIGS. 3 and 4, the elements of which are also shown in FIGS. 1 and 2 being identified with the same reference numerals, is provided, on its sheath 6 or the optional reinforcing layer 7, with a first protective layer 22 made of polyethylene, a second protective layer 23 made of wound filaments or tapes of jute and having a thickness "s", and an external metal armor 24 formed by a plurality of wires 25.

In this cable, having an external armor, the longitudinal duct can be in the first protective layer 22 of extruded polyethylene, as indicated in FIG. 1.

Alternatively, or in addition, analogously to the structure of the cable of FIG. 2, the longitudinal duct is a tube 26 of stainless steel, having a diameter "d", which is inserted in the protective jute layer 23.

However, in the latter embodiment, there is the problem of correctly selecting the diameter "d" of the tube 26 of stainless steel with respect to the thickness "s" of the jute layer 23. In fact, if the thickness "s" of the jute layer 23 were equal to, or slightly greater than, the diameter "d" of tube 26, the tube 26 together with the optical fibers therein contained would be damaged during the cable laying operations.

In fact, it is known that during the laying operations, submarine cables are subjected to very strong axial and longitudinal stresses.

The wires 25 of the external armor 24, subjected to tension, tend to move toward the center of the cable and can squeeze the tube 26 or in any event, subject it to prejudicial stresses.

If, to avoid this danger, the thickness "s" of the jute layer 23 were increased until it is much greater than the diameter "d" of the tube 26, the jute layer 23 would become too soft and, during the cable laying operations, some wires 25 of the external armor 24 would be displaced with respect to the others, altering said armor and permanently damaging the cable.

It has been found that the optimum relative sizes which in all the conditions of use of the cable ensures the compactness of the armor and at the same time does not damage the tube 26 and the optical fibers therein contained are those in which the thickness "s" of the jute layer 23 is between three and four times the diameter "d" of the tube 26.

The external armor 24 may be formed by rods, straps or keystone shaped wires, and no limitation exists as to the position of tube 26. Said tube 26, or similar tubes lying on the same circumference of the cable section, may be positioned on any cable radius within the layers 22 and/or 23 and may extend longitudinally of the cable with a rectilinear or a helical (closed or open helix) path and at a pitch which may be different from that of the helicoidal paths of the rods, straps or keystone shaped wires of the external armor 24.

In a preferred solution, when said armor is formed by rods 25, the tube 26 has its diameter lying on a radius of the cable which passes through the tangent point between two rods 25. Moreover, the tube 26 extends longitudinally of the cable with a helical path and at a pitch substantially equal to the pitch of the helicoidal paths of the rods 25. This is because the compression stress exerted by rods 25 on the jute layer 23 is a maximum along the generatrices of tangency between said rods and said layer and is a minimum in the area of tangency between two adjacent rods 25, namely, along the radii of the cable passing through the tangent points of adjacent rods 25.

By means of this preferred solution, the thickness of the jute layer 23 can be further reduced, e.g. to two to three times the diameter of the tube 26.

The invention has been illustrated with respect to only one tube made of stainless steel and having a circular section, but it will be apparent that two or more tubes can be provided, equally spaced from one another in a circle in the outer protective layer, that the tubes may have any desired cross-section, such as circular, elliptical, etc., and that the tubes may also be made of a plastic material or of any metal alloy resistant to corrosion, having a Young's modulus E not lower than 19,000 $Kg/mm^2$ and having a yield elastic limit of 0.8.

From the foregoing description, it is clear that the longitudinal ducts or channels containing the optical fibers are disposed in the protective layers already present in cables used only to convey electric power. Accordingly, the invention provides cables conveying electric power and transmitting optical signals which have substantially the same diameter as cables which are used only for conveying electric power.

Consequently, the cables used to convey electric power and to transmit optical signals in accordance with the present invention are easy to handle and have substantially the same production costs as the cables intended only for conveying electric power.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A cable for conveying electric power and for transmitting optical signals which comprises at least an electric conductor, insulation surrounding the conductor, a metal sheath around said insulation and a protective layer around said metal sheath, the improvement comprising at least one duct within said protective layer and extending longitudinally of said cable and at least one optical fiber within said duct.

2. A cable as set forth in claim 1 wherein said protective layer is made of extruded polymeric material and wherein said duct is a tube embedded in said protective layer.

3. A cable as set forth in claim 2 wherein said tube is a tube of stainless steel.

4. A cable as set forth in claim 2 wherein said tube is a tube of plastic material.

5. A cable as set forth in claim 2 wherein said tube is a tube of a metal alloy having a Young's modulus of elasticity of at least 19,000 $Kg/mm^2$ and a yield elastic limit of 0.8.

6. A cable as set forth in claim 1 wherein said optical fiber is loosely received in said duct.

7. A cable for conveying electric power and for transmitting optical signals which comprises at least an electric conductor, insulation surrounding the conductor, a sheath around said insulation, a protective layer around said sheath, said protective layer comprising a radially innermost winding of plastic tape and a radially outermost layer of extruded polymeric material, at least one duct within said winding of plastic tape and extending longitudinally of said cable and at least one optical fiber within said duct.

8. A cable for conveying electric power and for transmitting optical signals which comprises at least one electrical conductor, insulation surrounding the conductor, a sheath around said insulation, a protective layer around said sheath, said protective layer comprising a radially inner layer of extruded polymeric material and a radially outer winding of protective material, at least one duct extending longitudinally of said cable and disposed in said radially inner layer, at least one optical fiber within said duct, and an external armour around said protective layer.

9. A cable as set forth in claim 8 wherein said duct is a tube embedded in said radially inner layer.

10. A cable as set forth in claim 8 wherein at least one further said duct is disposed in said radially outer layer and has at least one optical fiber therein.

11. A cable as set forth in claim 10 wherein said duct is a tube embedded in said radially outer layer.

12. A cable for conveying electric power and for transmitting optical signals which comprises at least one electrical conductor, insulation surrounding the conductor, a sheath around said insulation, a protective layer around said sheath, said protective layer comprising a radially inner layer of extruded polymeric material and a radially outer layer of a winding of a protective material, at least one duct extending longitudinally of said cable and disposed in said radially outer layer, at least one optical fiber within said duct, and an external armour around said protective layer.

13. A cable as set forth in claim 12 wherein said duct is a tube embedded in said radially outer layer.

14. A cable as set forth in claim 12 wherein said radially outer layer has a radial thickness from about two to about four times the external cross-sectional dimension of said duct.

15. A cable as set forth in claim 14 wherein said duct is a tube embedded in said winding of plastic tape.

16. A cable as set forth in claim 12 wherein said external armor is a plurality of mechanically resistant, elongated elements having circular cross-section and disposed side-by-side.

17. A cable as set forth in claim 16 wherein said mechanically resistant elongated elements are in contact and wherein said duct is disposed with its axis lying substantially on a radius of the cable passing through the tangent point of two of said mechanically resistant elongated elements.

18. A cable as set forth in claim 17 wherein said mechanically resistant, elongated elements are helically wound and said duct follows a helical path with a helical pitch which is substantially equal to the helical pitch of said mechanically resistant, elongated elements.

19. A cable as set forth in claim 16 wherein said radially outer layer has a thickness from about two to about three times the external cross-sectional dimension of said duct.

20. A cable as set forth in claim 12 wherein said external armor is a plurality of mechanically resistant, elongated elements having a non-circular cross-section and disposed side-by-side.

* * * * *